United States Patent Office 3,054,669
Patented Sept. 18, 1962

3,054,669
SLOW-ACTING FERTILIZERS COMPRISING CROTYLIDENE DIUREA
Johann Jung, Limburgerhof (Pfalz), Hans-Ottmar Mueller von Blumencron, Koeln-Braunsfeld, Carl Pfaff, Limburgerhof (Pfalz), and Hans Scheuermann, Ludwigshafen (Rhine)-Oggersheim, Germany, assignors to Badische Anilin- & Soda-Fabrik Aktiengesellschaft, Ludwigshafen (Rhine), Germany
No Drawing. Filed Feb. 1, 1960, Ser. No. 5,667
Claims priority, application Germany Feb. 4, 1959
6 Claims. (Cl. 71—28)

This invention relates to slow-acting nitrogenous fertilizers and a method for their application. More particularly, the invention relates to crotylidene diurea-containing fertilizers and their application.

In the application of commercial fertilizers an attempt is made to adapt the supply of nutriments to the needs of the plants both as regards amount and time. Whereas it is known that a reserve fertilizing is possible with the nutrient phosphorus and is also usual, the usual experience advises against reserve fertilizing with mineral nitrogen.

In areas of heavy rainfall, as for example in the tropics, and also in irrigated areas, large dosages of nitrogen may lead to losses by washing out. In other cases the further increase of the yields may also be limited by too high a concentration of readily soluble nitrogen salts in the soil.

For a long time condensation products of urea with formaldehyde, so-called "Ureaform" preparations, have been used as slow-acting nitrogen fertilizers. Their action is however usually unsatisfactory in view of the fact that a small proportion of the nitrogen presented in the form of a urea-formaldehyde condensate is used up within a very short time, whereas a large part cannot be utilized by the plants at all. The desired slow and enduring action occurs only to a small extent with these products.

It is an object of the present invention to provide fertilizers having a slow action in the soil.

A further object is to provide fertilizers which are washed out from the soil only to a negligible extent.

Another object of the invention is to provide fertilizers which can be applied in large amounts without producing a high concentration of readily soluble nitrogen salts in the soil.

Still another object of the invention is to provide slow-acting fertilizers, in which the plants can utilize the bulk of the nitrogen content.

We have found that these and other objects and advantages are achieved by using crotylidene diurea, a fertilizer having a slow and enduring action. Besides yielding nitrogen uniformly, this compound also has the advantage, as compared with mineral nitrogen fertilizers that it is washed out only with difficulty and also permits a very large dosage without any risk for the plants being fertilized.

The slow action of crotylidene diurea is not influenced by admixture of readily soluble, i.e., rapid-acting, nitrogen fertilizers, or other nutrients or fertilizers. Its action may be additionally retarded by granulation. On the other hand by the incorporation of varying amounts of rapid-acting nitrogen fertilizers, an individual adaptation to the different nitrogen requirements of the plant during the early stages can be achieved.

Crotylidene diurea can be prepared by the reaction of crotonaldehyde with urea in acid aqueous solution as described in U.S. patent specification No. 2,264,400.

It contains about 32 to 34% of nitrogen depending on the purity of the product. The amounts to be used for fertilizing are different in each case because they are dependent on many factors, such as the nature of the cultivated plants, condition of the soil, climate and season. In a single application, the following amounts of fertilizer are suitable (expressed in kilograms of pure nitrogen per hectare, i.e., 1 kilogram of pure nitrogen, corresponding to about 3 kilograms of crotylidene diurea), for example, with the various cultivated plants:

| | Kilograms |
|---|---|
| Root vegetables | 100 to 200 |
| Grain | 50 to 80 |
| Oleaginous plants (rape) | 100 to 150 |
| Pasturage | 100 to 150 |
| Lawns | 100 to 300 |
| Vegetables | 50 to 200 |
| Vines | 100 to 200 |

Testing of crotylidene diurea as to its fertilizing action can readily be carried out by vessel experiment (Mitscherlich vessels). Lolium perenne is especially suitable as a test plant because this plant, by reason of its regenerative power, permits several crops (cuttings) without it being necessary to change the soil texture. In this way it is possible to follow accurately the absorption of the nitrogen and above all its enduring action over a prolonged period of time. Controlled water supply similarly permits a comparative testing of different nitrogen compounds as regards the extent to which they are washed out from the soil.

To improve the fertilizing action, crotylidene diurea may be mixed with other mineral or organic fertilizers, as for example rapid or slow-acting potash, phosphorus, or nitrogen, for example urea, fertilizers, or with mixtures of the same or with fertilizers based on humus, and then used in this form as a component of a fertilizer mixture.

The mixing ratio of crotylidene diurea to another fertilizer may vary from 1:0.01 to 1:100 (parts of crotylidene diurea to parts of another fertilizer).

To facilitate scattering and to avoid dusting, crotylidene diurea may also be used in admixture with inert materials or with a fertilizer and an inert material or extender. Suitable inert materials or extenders are for example peat, clay or wood waste products (lignins). The mixing ratio of crotylidene diurea to inert material or extender may vary from 1:0.01 to 1:100 (parts of crotylidene diurea to parts of an inert material or extender.

The following examples illustrate the slow fertilizing action of crotylidene diurea.

EXAMPLE 1

A vegetation test is carried out in Mitscherlich vessels with loamy sandy soil with Lolium perenne as the test plant. Besides a fertilizer containing phosphorus and potassium compounds, 1.5 grams of nitrogen in the form of the nitrogen compound to be tested are added to each vessel. The water supply is measured at 60% of the maximum water capacity of the soil. There is therefore no ground water.

Four cuttings of the Lolium perenne are carried out in all during the test period lasting from May to November.

The yields (column A) and nitrogen extraction values (column B) are shown in the following Table 1. The cuttings were carried out as follows: 1st cut, June 16; 2nd cut, July 16; 3rd cut, September 10 and 4th cut, November 26. From the figures given in the table it will be seen that the nitrogen fertilizing action of crotylidene diurea is considerably slower and more enduring than that of the substances used for comparison.

*Table 1*

| Substance used as nitrogen fertilizer | 1st cut | | 2nd cut | | 3rd cut | | 4th cut | |
|---|---|---|---|---|---|---|---|---|
| | A | B | A | B | A | B | A | B |
| Control (without N-fertilization) | 3.6 | 56 | 1.1 | 18 | 1.3 | 22 | 1.5 | 26 |
| ammonium nitrate | 11.5 | 534 | 25.2 | 587 | 8.4 | 81 | 2.6 | 33 |
| casein | 10.1 | 494 | 22.2 | 444 | 7.6 | 81 | 2.8 | 37 |
| glycocoll | 10.0 | 500 | 21.4 | 458 | 8.1 | 79 | 3.4 | 44 |
| hippuric acid | 9.1 | 436 | 17.2 | 294 | 6.3 | 67 | 2.3 | 34 |
| ureaform [1] | 9.0 | 345 | 7.5 | 129 | 6.1 | 83 | 2.5 | 42 |
| crotylidene diurea | 5.7 | 153 | 13.5 | 305 | 14.3 | 238 | 6.0 | 125 |

[1] Commercial ureaform fertilizer with 38% total N.

The yield values are expressed in grams of dry substance per vessel and the values for the nitrogen extraction in milligrams of nitrogen per vessel.

*Example 2*

A vegetation test is carried out with Lolium perenne in the way described in Example 1 and seven days prior to the first cut a large amount of water is added all at once. The water dosage—after previous saturation of the soil with water—is 500 ccs. per vessel. In the ground water (i.e. water which has penetrated the soil and collected at the bottom), the following amounts of nitrogen are detected:

Test series with:                   Milligrams of N
- Control (without nitrogen fertilizer) _____ 46
- Ammonium nitrate _____ 908
- Casein _____ 621
- Glycocoll _____ 665
- Hippuric acid _____ 507
- Ureaform _____ 200
- Crotylidene diurea _____ 236

It will be seen from these figures that among the various nitrogen compounds, crotylidene diurea and ureaform show by far the least loss by washing out. In the case of crotylidene diurea there is therefore a very great superiority in yield over the compounds with high washing out of nitrogen (see Table 2). This is not so for ureaform, however, because in this case the low washing out is counteracted by the relatively bad utilization of nitrogen. The differences in yield between ammonium nitrate, ureaform and crotylidene diurea after the fourth cut are 22.8:23.0:36.1 grams in all of dry substance per vessel. The following overall differences in nitrogen absorption result between these three compounds after the fourth cut:

Mg. N per vessel
- Ammonium nitrate _____ 561
- Ureaform _____ 473
- Crotylidene diurea _____ 766

In the following Table 2, columns A and B give the yields and nitrogen extractions, respectively, and the cuttings were made at the following times: 1st cut, June 16; 2nd cut, July 16; 3rd cut, September 10 and 4th cut, November 26.

*Table 2*

| Substance used: | 1st cut | | 2nd cut | | 3rd cut | | 4th cut | |
|---|---|---|---|---|---|---|---|---|
| | A | B | A | B | A | B | A | B |
| Control (without N-fertilizer) | 3.3 | 58 | 1.1 | 17 | 1.9 | 26 | 1.6 | 28 |
| ammonium nitrate | 8.3 | 363 | 9.2 | 134 | 3.4 | 37 | 1.9 | 27 |
| casein | 11.4 | 405 | 6.7 | 92 | 3.8 | 47 | 2.1 | 35 |
| glycocoll | 10.1 | 387 | 6.5 | 92 | 3.4 | 42 | 2.3 | 35 |
| hippuric acid | 9.9 | 238 | 5.6 | 82 | 3.5 | 43 | 1.9 | 32 |
| ureaform [1] | 8.6 | 245 | 5.9 | 101 | 5.7 | 82 | 2.8 | 45 |
| crotylidene diurea | 6.4 | 164 | 9.9 | 218 | 13.6 | 231 | 6.2 | 153 |

[1] Commercial ureaform fertilizer with 38% total N.

The figures for yields and nitrogen extraction are given in the same units as in Table 1.

EXAMPLE 3

To examine the question as to what injury occurs to cultivated plants when nitrogen fertilizers are added to them in larger amounts than usual, a test is carried out in Mitscherlich vessels with corn. The nitrogen is supplied in the form of ammonium nitrate and crotylidene diurea in increasing dosages up to 15 grams of nitrogen per vessel. In the development of the corn plants it is observed that at 5 grams of N as ammonium nitrate there occurs a strong inhibition of the growth of the young plants, whereas in the case of fertilizing with crotylidene diurea there is no detectable depression of growth even at 15 grams of N. In the case of plants fertilized with ammonium nitrate, the corn plants manured with 7.5 and 15 grams of N perish completely, whereas the plants fertilized with crotylidene diurea exhibit a very good development. The results of the test may be seen from the following Table 3.

*Table 3*

| Nitrogen dosage per vessel, grams: | Yield of dry substance per vessel, grams |
|---|---|
| Nil | 25.3 |
| As ammonium nitrate: | |
| 1.0 | 91.0 |
| 5.0 | 76.4 |
| 7.5 | (1) |
| 15.0 | (1) |
| As crotylidene diurea: | |
| 1.0 | 72.8 |
| 5.0 | 100.0 |
| 7.5 | 113.1 |
| 15.0 | 116.4 |

[1] Total destruction.

EXAMPLE 4

A lawn (garden-plot) 100 m.² in size is fertilized in the middle of March with 16.5 kg. of a fertilizer which contains 12% of potassium (calculated as $K_2O$), 6% of phosphorus (calculated as $P_2O_5$) and 18% of nitrogen and which has been prepared by mixing potassium chloride, secondary calcium phosphate and crotylidene diurea. The lawn is mowed every 2 or 3 weeks and grows well. It does not have to be fertilized again for a full year.

The lawn may be fertilized twice with equally good success by using first a corresponding amount of a potassium-phosphorus fertilizer and then a mixture of crotylidene diurea and peat.

A mixture of crotylidene diurea and urea also lends itself well for the purpose.

We claim:

1. A process of fertilization of soil which comprises enriching the available nitrogen content of soil by adding thereto crotylidene diurea.

2. A process of fertilization of soil which comprises enriching the available nitrogen content of soil by adding thereto a fertilizer composition containing, as a slow-acting supplier of available nitrogen, crotylidene diurea.

3. A fertilizer composition comprising a mixture of crotylidene diurea, serving as a slow-acting supplier of available nitrogen, and a second soil fertilizing ingredient other than crotylidene diurea selected from the group consisting of mineral and organic fertilizers wherein the weight ratio in said composition of said crotylidene diurea to said second fertilizing ingredient is in the range of 1:0.01 to 1:100.

4. A fertilizer composition comprising a mixture of crotylidene diurea, serving as a slow-acting supplier of available nitrogen, and urea in a weight ratio in said composition of crotylidene diurea to urea in the range of 1:0.01 to 1:100.

5. A composition adapted to be added to soil to enrich the available nitrogen content of the soil comprising a mixture of crotylidene diurea, serving as a slow-acting supplier of available nitrogen, and inert solids serving as extenders for said crotylidene diurea wherein the weight ratio of said crotylidene diurea to said solids is in the range of 1:0.01 to 1:100.

6. The composition of claim 5 wherein said solids are selected from the group consisting of peat, clay, and lignins.

References Cited in the file of this patent
UNITED STATES PATENTS

| | | |
|---|---|---|
| 2,264,400 | Ott et al. | Dec. 2, 1941 |
| 2,541,005 | Oldham et al. | Feb. 6, 1951 |
| 2,572,256 | Garner et al. | Oct. 23, 1951 |
| 2,618,546 | Davenport | Nov. 18, 1952 |
| 2,729,611 | Chesley et al. | Jan. 3, 1956 |